(12) United States Patent
Kandaswamy et al.

(10) Patent No.: US 10,909,106 B2
(45) Date of Patent: Feb. 2, 2021

(54) SYSTEMS AND METHODS FOR CREATING AND MAINTAINING REFERENTIAL INTEGRITY OF DATA ACROSS MULTIPLE SERVER SYSTEMS

(71) Applicant: WAL-MART STORES, INC., Bentonville, AR (US)

(72) Inventors: Venkatesh Kandaswamy, San Ramon, CA (US); Karthik Deivasigamani, Sunnyvale, CA (US); Arvind Chockalingam Senthil Kumaran, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 313 days.

(21) Appl. No.: 15/349,796

(22) Filed: Nov. 11, 2016

(65) Prior Publication Data
US 2018/0137162 A1    May 17, 2018

(51) Int. Cl.
*G06F 16/23* (2019.01)
*G06Q 10/08* (2012.01)
*G06F 16/27* (2019.01)
*G06F 11/14* (2006.01)

(52) U.S. Cl.
CPC ...... *G06F 16/2365* (2019.01); *G06F 11/1474* (2013.01); *G06F 16/2372* (2019.01); *G06F 16/275* (2019.01); *G06Q 10/087* (2013.01)

(58) Field of Classification Search
CPC ......... G06F 17/30371; G06F 17/30566; G06F 16/275; G06F 16/27; G06F 16/2372; G06F 16/2379; G06F 11/1474; G06F 16/2365; G06Q 10/087
See application file for complete search history.

(56) References Cited

U.S. PATENT DOCUMENTS

| 4,947,320 A * | 8/1990 | Crus ................. G06F 17/30371 364/200 |
| 5,546,576 A * | 8/1996 | Cochrane .......... G06F 17/30371 395/600 |
| 6,374,243 B1 * | 4/2002 | Kobayashi ........ G06F 17/30377 707/703 |
| 6,381,617 B1 * | 4/2002 | Frolund ............. H04L 67/1008 |

(Continued)

*Primary Examiner* — Marc S Somers
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of transmitting an action command to each of a first server and a second server, the action command comprising one or more operation statements, transmitting an undo operation statement to each of the first server and the second server with each of the one or more operation statements, and receiving a fail notification from the second server indicating that an action associated with the action command has failed if one of the operation statements has failed on the second server. The operation statements can include instructions to create, modify, or delete a referential relationship. The undo operation statements can include instructions to undo operations associated with the operation statements.

20 Claims, 7 Drawing Sheets

(56) References Cited

U.S. PATENT DOCUMENTS

| | | | | |
|---|---|---|---|---|
| 8,635,113 B2* | 1/2014 | Borders | ............ | G06Q 10/0631 705/27.1 |
| 2002/0013846 A1* | 1/2002 | Vuong | ............... | H04L 41/0213 709/226 |
| 2002/0194242 A1* | 12/2002 | Chandrasekaran | ..... | G06F 9/466 718/101 |
| 2005/0278394 A1* | 12/2005 | Oks | ..................... | G06F 11/1402 |
| 2009/0055445 A1* | 2/2009 | Liu | ....................... | G06F 16/258 |
| 2011/0225121 A1* | 9/2011 | Cooper | ................. | G06F 16/273 707/634 |
| 2014/0006367 A1* | 1/2014 | Hills | ................ | G06F 17/30292 707/702 |

* cited by examiner

400

405 – Transmitting an action command to each of a first server and a second server, the action command comprising one or more operation statements.

410 – Transmitting an undo operation statement to each of the first server and the second server with each of the one or more operation statements.

415 – Receiving a fail notification from the second server indicating than an action associated with the action command has failed.

705 – Receiving an action command, the action command comprising one or more operation statements.

710 – Receiving an undo operation statement with each of the one or more operation statements.

715 – Performing one or more operations associated with the one or more operation statements of the action command.

720 – Receiving notification from a remote server that at least one of the one or more operations associated with the one or more operation statements of the action command has failed on a remote server.

725 – Performing an undo operation associated with the undo operation statement to undo the one or more operations associated with the one or more operation statements of the action command.

730 – Transmitting a fail notification indicating that an action associated with the action command has failed and all operations have been undone.

FIG. 7

SYSTEMS AND METHODS FOR CREATING AND MAINTAINING REFERENTIAL INTEGRITY OF DATA ACROSS MULTIPLE SERVER SYSTEMS

TECHNICAL FIELD

This disclosure relates generally to systems and methods for creating and maintaining referential integrity of data across multiple server systems.

BACKGROUND

With many applications being hosted on cloud server systems, data can be distributed across numerous servers. The amount of data being collected and housed also is continuously increasing. Data also can be replicated across multiple servers, but the replicas are not always consistent with one another at a given point of time. In conventional systems, it is difficult to have a function that every server of a multiple server system reads at the same time to obtain the same singleton value. Moreover, conventional attempts to solve this problem sacrifice performance and scalability of the overall system. Thus, in conventional systems, some functionality such as referential integrity is delegated to single machine databases.

Referential integrity is necessary to allow administrators to identify and record data consistently. To ensure referential integrity of data, conventional systems store keys and other referencing material in a relational database. Conventional relational databases can support creation of a singleton process to ensure that race conditions do not occur, but a singleton process increases the processing cost in the relational database. Conventional databases are designed to run on one machine, and may be replicated to another machine. Scalability and performance limits are reached very quickly with these conventional relational databases. Thus, operators of systems with large amounts of data need to choose between scaling to large numbers of operations on a cloud-based system at the cost of efficient referential integrity, or using traditional data stores that provide referential integrity at the expense of scalability, performance, and increased operating costs.

BRIEF DESCRIPTION OF THE DRAWINGS

To facilitate further description of the embodiments, the following drawings are provided in which:

FIG. 4 is a flowchart for a first method, according to certain embodiments;

FIG. 7 is a flowchart for a second method, according to certain embodiments.

Figure 1:
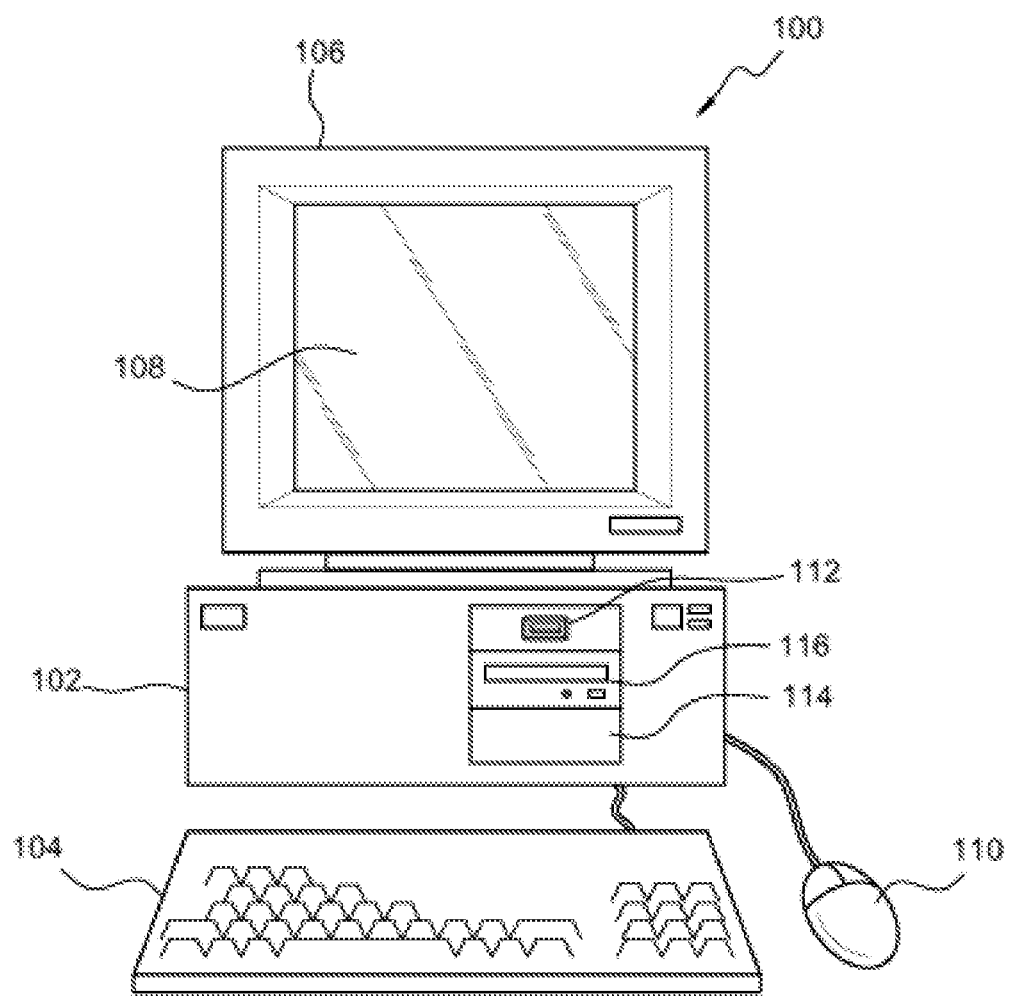
FIG. 1 illustrates a front elevational view of a computer system that is suitable for implementing various embodiments of the systems disclosed in FIGS. 3 and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform the act of transmitting an action command to each of a first server and a second server, the action command comprising one or more operation statements. The one or more operation statements can include at least one of (1) a first operation statement with instructions to perform a first operation of creating a referential relationship between data on the first server and the second server, (2) a second operation statement with instructions to perform a second operation of updating the referential relationship between the data on the first server and the second server, or (3) a third operation statement with instructions to perform a third operation of deleting the referential relationship between the data on the first server and the second server. The one or more storage modules can be configured to run on one or more processing modules and perform the act of transmitting an undo operation statement to each of the first server and the second server with each of the one or more operation statements. The undo operation statement can comprise at least one of (1) a first undo operation statement with instructions to undo the first operation, (2) a second operation statement with instructions to undo the second operation, or (3) a third undo operation statement with instructions to undo the third operation. The first server can perform an undo operation according to the undo operation statement responsive to receiving communication from the second server that at least one of the first operation, the second operation, or the third operation has failed on the second server. The one or more storage modules can be configured to run on the one or more processing modules and perform the act of receiving a fail notification from the second server indicating that an action associated with the action command has failed if the first operation, the second operation, or the third operation has failed on the second server.

Various embodiments include a method. The method can include transmitting an action command to each of a first server and a second server, the action command comprising one or more operation statements. The one or more operation statements can include at least one of (1) a first operation statement with instructions to perform a first operation of creating a referential relationship between data on the first server and the second server, (2) a second operation statement with instructions to perform a second operation of updating the referential relationship between the data on the first server and the second server, or (3) a third operation statement with instructions to perform a third operation of deleting the referential relationship between the data on the first server and the second server. The method can further include transmitting an undo operation statement to each of the first server and the second server with each of the one or more operation statements. The undo operation statement can include at least one of (1) a first undo operation statement with instructions to undo the first operation, (2) a second operation statement with instructions to undo the second operation, or (3) a third undo operation statement with instructions to undo the third operation. The first server can perform an undo operation according to the undo operation statement responsive to receiving communication from the second server that at least one of the first operation, the second operation, or the third operation has failed on the second server. The method can further include receiving a fail notification from the second server indicating that an action associated with the action command has failed if the first operation, the second operation, or the third operation has failed on the second server.

A number of embodiments can include a system. The system can include one or more processing modules and one or more non-transitory storage modules storing computing instructions configured to run on the one or more processing modules. The one or more storage modules can be configured to run on the one or more processing modules and perform the act of transmitting an action command to each of a first server and a second server located remotely from one another and operating as part of a cloud system of servers. The action command can include one or more operation statements. The one or more operation statements can include at least one of: a first operation statement with instructions to perform a first operation of creating a referential relationship between at least one of (1) a universal product code (UPC) of a product of an ecommerce website added to both the first server and the second server, or (2) a stock keeping unit (SKU) of the product of the ecommerce website added to both the first server and the second server; a second operation statement with instructions to perform a second operation of updating the referential relationship between at least one of (1) the UPC of the product of the ecommerce website previously added to both the first server and the second server by including the SKU of the product of the ecommerce website with the UPC, (2) the SKU of the product of the ecommerce website previously added to both the first server and the second server by including the UPC of the product of the ecommerce web site with the UPC, or (3) the UPC or the SKU of the product of the ecommerce website previously added to both the first server and the second server by modifying the UPC or the SKU of the product of the ecommerce web site; or a third operation statement with instructions to perform a third operation of deleting the referential relationship between at least one of (1) the UPC of the product of the ecommerce website previously added to both the first server and the second server by deleting the UPC of the product of the ecommerce website from both the first server and the second server, or (2) the SKU of the product of the ecommerce website previously added to both the first server and the second server by deleting the SKU of the product of the ecommerce website from both the first server and the second server. The one or more storage modules can be configured to run on the one or more processing modules and perform the act of transmitting an undo operation statement to each of the first server and the second server with each of the one or more operation statements of the action command. The undo operation statement can include at least one of (1) a first undo operation statement with instructions to undo the first operation, (2) a second operation statement with instructions to undo the second operation, or (3) a third undo operation statement with instructions to undo the third operation. The first server can perform an undo operation according to the undo operation statement responsive to receiving communication from the second server that at least one of the first operation, the second operation, or the third operation has failed on the second server. The one or more storage modules can be configured to run on the one or more processing modules and perform the act of receiving a fail notification from the second server indicating that an action associated with the action command has failed if the first operation, the second operation, or the third operation has failed on the second server.

With many applications being hosted on cloud server systems, data can be distributed across numerous servers. The amount of data being collected and housed also is continuously increasing. Data also can be replicated across multiple servers, but the replicas are not always consistent with one another at a given point of time. In conventional systems, it is difficult to have a function that every server of a multiple server system reads at the same time to obtain the same singleton value. Moreover, conventional attempts to solve this problem sacrifice performance and scalability of the overall system. Thus, in conventional systems, some functionality such as referential integrity is delegated to single machine databases.

Referential integrity is necessary to allow administrators to identify and record data consistently. For example, a seller may desire to sell products from multiple suppliers. The products could be identified by a "key" so that the seller can record the product and later find the product in the seller's data. This key can include a globally unique identifier, such as a universal product code (UPC). Occasionally, however, the seller may have a unique identifier to refer to the product—such as a stock keeping unit (SKU). The seller must assign a SKU to every UPC received from the suppliers.

While assigning a SKU to every UPC may seem like a simple task, it can be a very complex process for the seller. For example, assume that the SKUs are sequential numbers and are assigned in increasing order from the next available number. The seller must record the next available number somewhere so that every server in a cloud-based system can see the number as a singleton. The seller must then increment the number when assigning the SKU and store the next available number. The process that increments and saves this number need run only once in one place as a singleton, but if several processes increment and save the number, the numbers can become inconsistent because the processes may overlap with one another.

By way of another example, assume that SKUs are assigned as random numbers. A process that generates a random number will have to check that it was not already used elsewhere. This technique requires processes that must synchronize with each other to avoid multiple processes generating the same number for two different products.

By way of a further example, two suppliers could have two different UPCs for the same product. The seller would prefer one SKU linked to two different UPCs, rather than two different entries in the seller's data. The two processes, however, do not know about one another, and the two processes may create individual links without knowing about the other process.

To ensure referential integrity of data, conventional systems store keys and other referencing material in a relational database. Conventional relational databases can support the creation of a singleton process to ensure that race conditions do not occur, but a singleton process increases the processing cost for the relational database. Conventional databases are designed to run on one machine, and may be replicated to another machine. Scalability and performance limits are reached very quickly with these conventional relational databases because the relational databases cannot be deployed across any more than a handful of machines. Environments with large amounts of data may, however, require hundreds of servers. Thus, operators of systems with large amounts of data have conventionally been left to choose between scaling to a large number of operations on a cloud-based system at the cost of efficient referential integrity, or traditional data stores that provide referential integrity at the expense of scalability, performance, and operating costs.

Embodiments described in this disclosure are configured to solve this problem of achieving referential integrity without use of traditional data stores on single machines. This solution allows operators to avoid the expense of using traditional data stores, while still providing scalability necessary for large amounts of data. In some embodiments, an application, such as system 300 (FIG. 3, described below) requiring referential integrity will call the solution and provide information to a plurality of servers.

Generally, the information sent to the plurality of servers can comprise an action command requiring referential integrity. The action command can comprise one or more of individual operation statements with instructions to perform operations such as creating a referential relationship on the plurality of servers, updating a referential relationship already existing on the plurality of servers to add new keys or change keys, and/or deleting a referential relationship already on the plurality of servers to remove keys. The information also can comprise a first operation statement, a first undo operation statement that can undo the first operation, a second operation statement, a second undo operation statement that can undo the second operation, and so on. If an operation fails on one server of the system, then other servers in the system receive notification that an operation has failed on a server in the system, and perform an undo operation associated with the operation to undo the operation on that server. In this way, referential integrity is maintained across the servers.

Implementation of embodiments of systems and methods of this disclosure leverage the fact that an application, such as system 300 (FIG. 3), has transmitted operation statements to the servers with instructions to undo operations associated with the operation statements if any of the operations fail on any of the servers. The set of operations can be considered as one unit in an action command, and the set of operations will all succeed together on all the servers or all fail together on all the servers. Additional details of the action commands, operation statements, and undo operation statements are provided below. In some embodiments, an underlying database can be leveraged to ensure the integrity of any single operation within an operation set of an action command. In some embodiments, the application, such as system 300 (FIG. 3), only needs to know the set of operation statements and their corresponding undo statements, and the multiple servers take care of performing the action using the operations and undoing operations if any operations of the action command fail.

Figure 2:
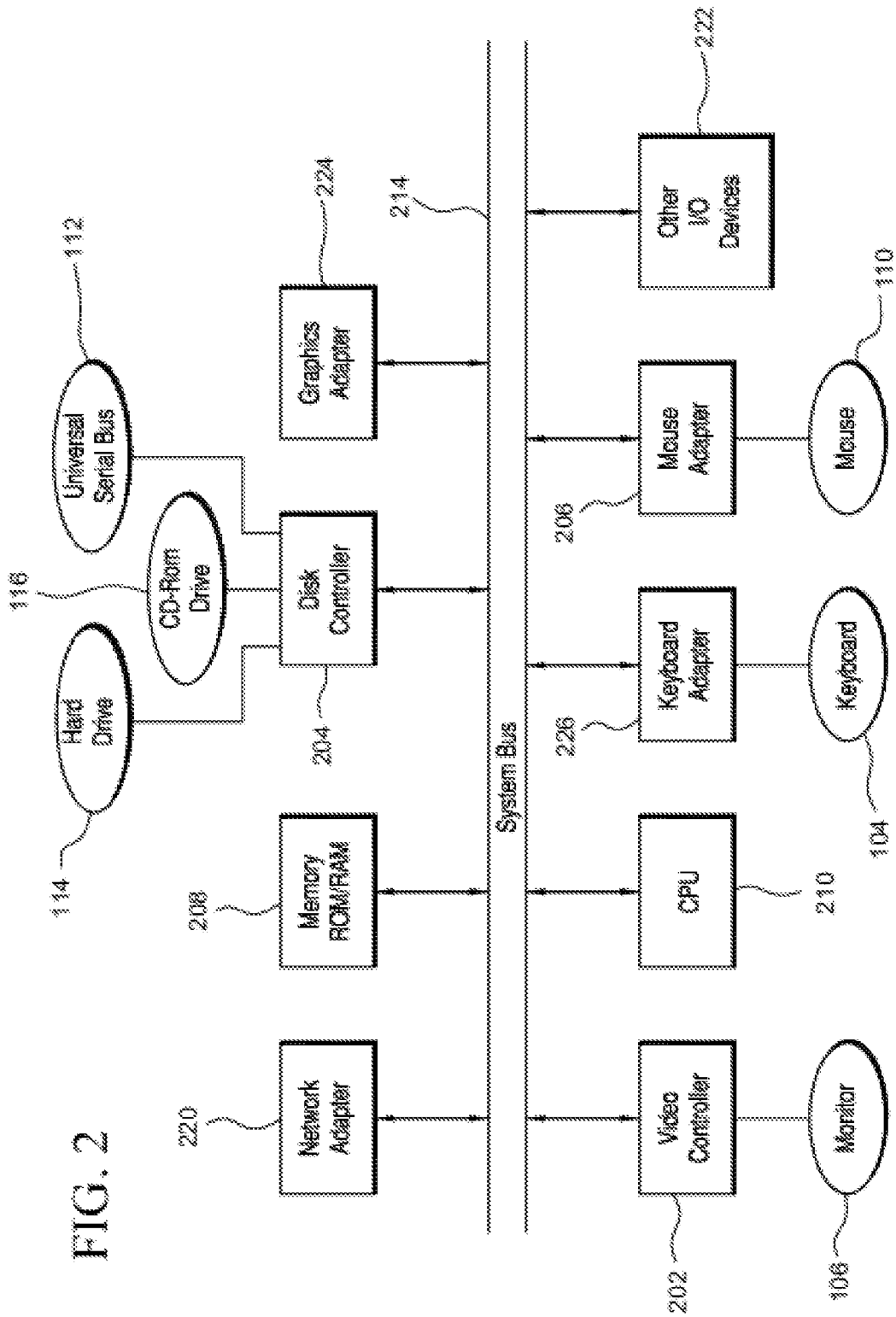
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
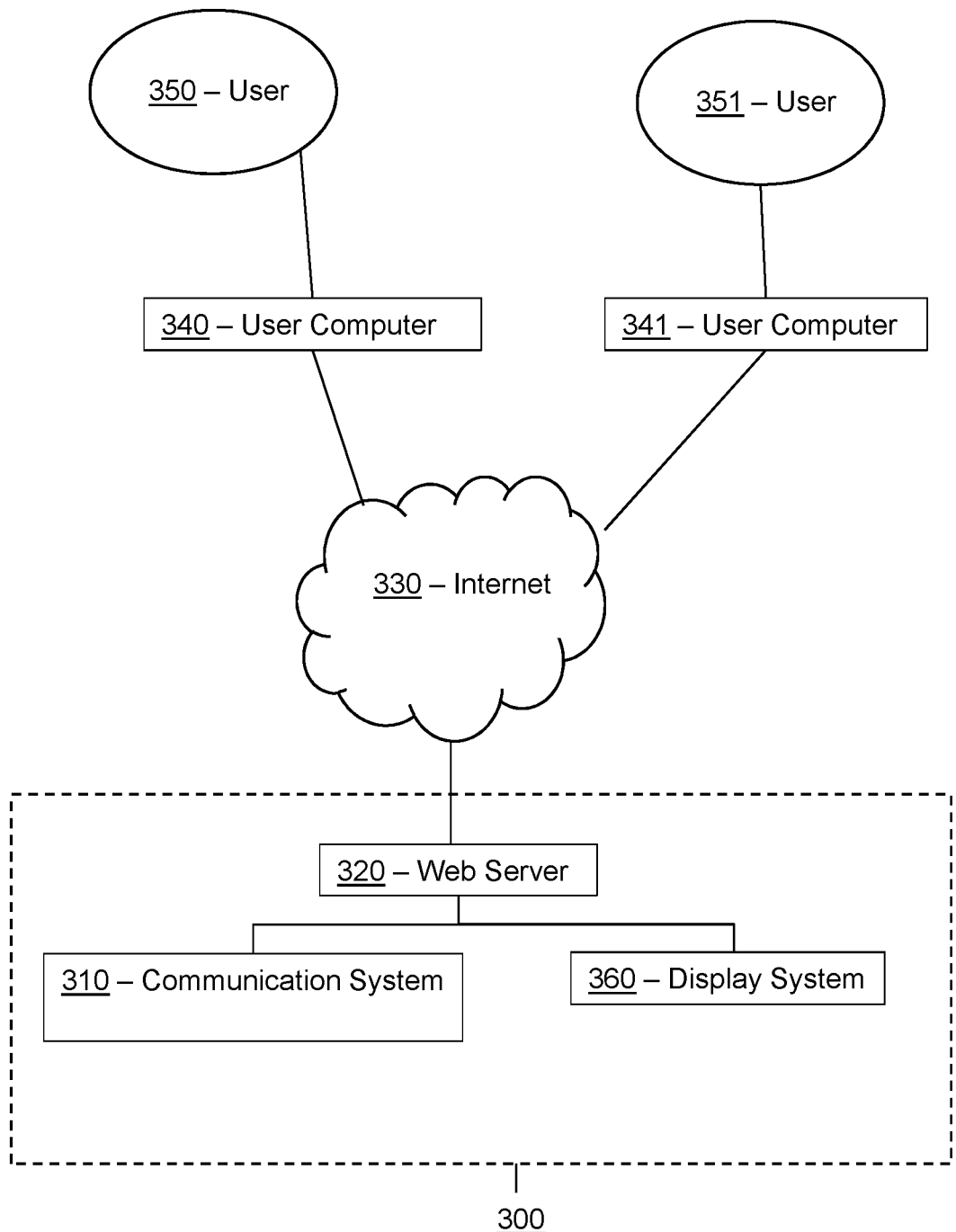
FIG. 3 illustrates a first representative block diagram of a system, according to an embodiment.

Turning ahead in the drawings, FIG. 3 illustrates a block diagram of a system 300 that can be employed for creating and maintaining referential integrity of data across multiple server systems. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a communication system 310, a web server 320, and/or a display system 360. Communication system 310, web server 320, and display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of communication system 310, web server 320, and display system 360.

Additional details regarding communication system 310, web server 320, and display system 360 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, communication system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) communication system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of communication system 310, web server 320, and/or display system 360. In a similar manner, the processing module(s) and the memory storage module(s) can be local and/or remote to each other.

In many embodiments, communication system 310, web server 320, and/or display system 360 can be configured to communicate with one or more customer computers 340 and 341. In some embodiments, customer computers 340 and 341 also can be referred to as user computers. In some embodiments, communication system 310, web server 320, and/or display system 360 can communicate or interface (e.g. interact) with one or more customer computers (such as customer computers 340 and 341) through a network or Internet 330. Internet 330 can be an intranet that is not open to the public. Accordingly, in many embodiments, communication system 310, web server 320, and/or display system 360 (and/or the software used by such systems) can refer to a back end of system 300 operated by an operator and/or administrator of system 300, and customer computers 340 and 341 (and/or the software used by such systems) can refer to a front end of system 300 used by one or more customers 350 and 351, respectively. In some embodiments, customers 350 and 351 also can be referred to as users. In these or other embodiments, the operator and/or administrator of system 300 can manage system 300, the processing module(s) of system 300, and/or the memory storage module(s) of system 300 using the input device(s) and/or display device(s) of system 300.

Figure 6:
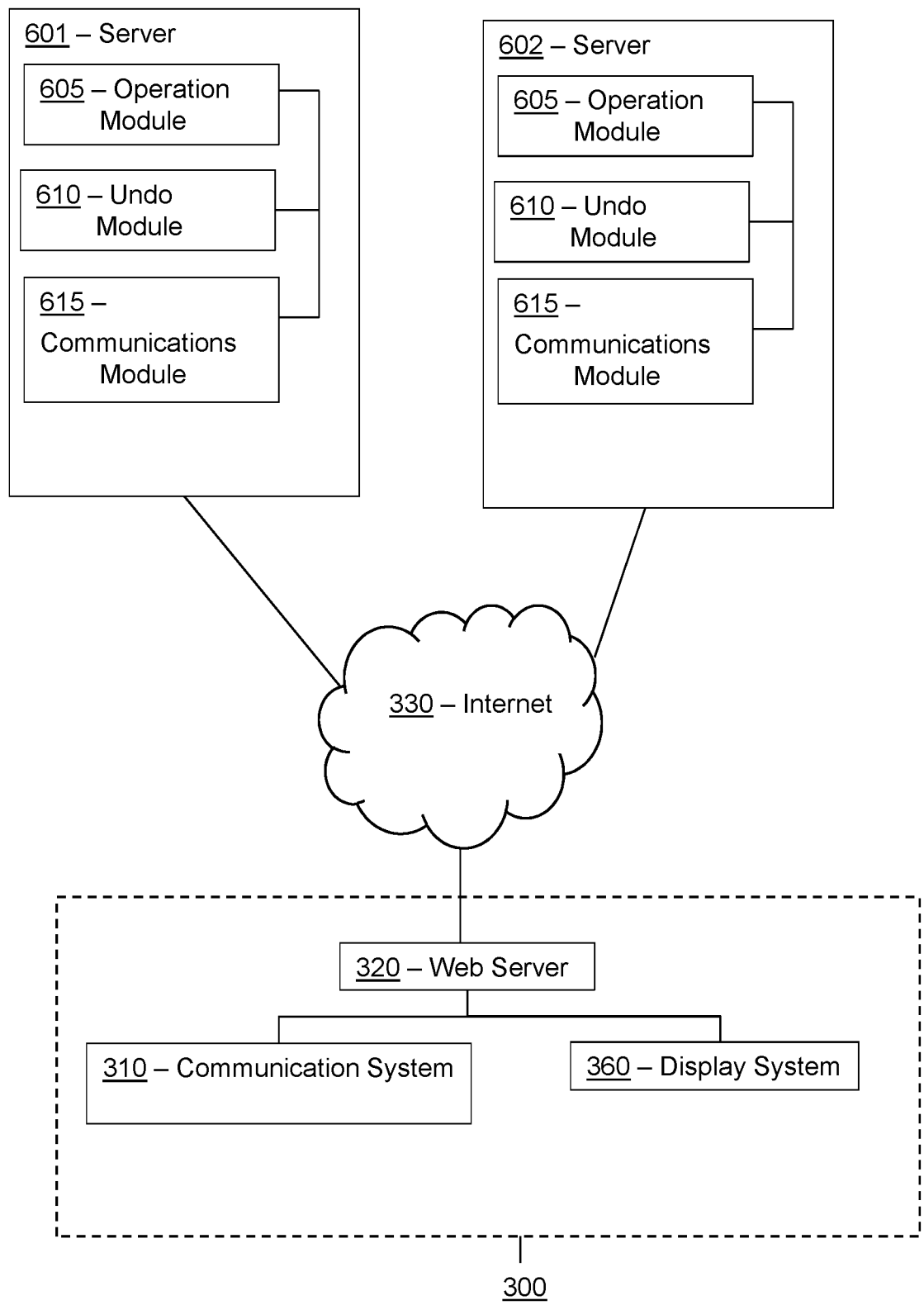
FIG. 6 illustrates a second representative block diagram of a system, according to an embodiments.

Meanwhile, in many embodiments, system 300 in general, and/or communication system 310, web server 320, and/or display system 360 in particular, also can be configured to communicate with one or more databases or servers. The one or more databases or servers can comprise a product database that contains information about products, items, UPCs, or SKUs sold by a retailer. Turning to FIG. 6, for example, in some embodiments, system 300 can be configured to communicate with servers 601 and 602 through a network or Internet 330. The servers 601 and 602 can comprise one or more memory storage modules (e.g., non-transitory memory storage module(s)), which can be similar or identical to the one or more memory storage module(s) (e.g., non-transitory memory storage module(s)) described above with respect to computer system 100 (FIG. 1). In some non-limiting embodiments, each of servers 601 and 602 can comprise non-transitory memory storage modules 605, 610, and 615. Memory storage module 605 can be referred to as operation module 605, memory storage module 610 can be referred to as undo module 610, and memory storage module 615 can be referred to as communications module 615.

Also, in some embodiments, each of servers 601 and 602 can comprise one or more databases that can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

In some embodiments, each of servers 601 and 602 can comprise a configuration similar to any of the configurations described above in relation to computer system 100, such as but not limited to a single computer, a single server, or a cluster or collection of computers or servers, or a cloud of computers or servers. In some embodiments, servers 601 and 602 operate as a cloud system of servers. Typically, a cluster or collection of servers can be used when the demand on server 601 or server 602 exceeds the reasonable capability of a single server or computer. In some embodiments, servers 601 and 602 are remote from one another and/or remote from system 300. Accordingly, servers 601 and 602 can be remote from one another in the same room or remote from one another in another part of the world. Furthermore, although system 300 is shown communicating with servers 601 and 602 in FIG. 6, it is contemplated that the systems and methods described herein can include any number of servers configured to communicate with system 300, such as but not limited to two servers, three servers, four servers, five servers, and so on.

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between communication system 310, web server 320, and display system 360, and/or the one or more databases or servers can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
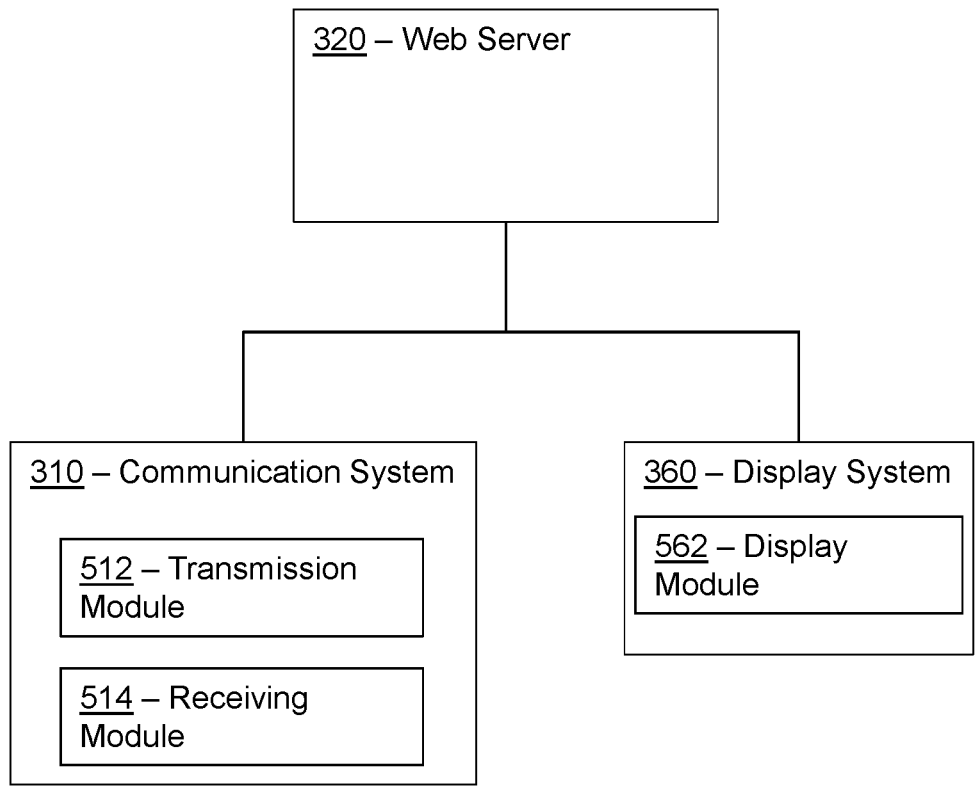
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, and/or 562 (FIG. 5). Such non-transitory memory storage modules can be part of a computer system such as communication system 310, web server 320, and/or display system 360 (FIGS. 3 & 5). The processing module(s) can be similar or identical to the processing module(s) described above with respect to computer system 100 (FIG. 1).

Method 400 can comprise an activity 405 of transmitting an action command to each of first server 601 (FIG. 6) and second server 602 (FIG. 6), where the action command can comprise one or more operation statements. Generally, an action command requiring referential integrity across multiple servers can comprise one or more operation statements with instructions to perform an action, such as but not limited to creating a referential relationship on the multiple servers, updating a pre-existing referential relationship on the multiple servers to add new keys or change keys, and/or deleting a pre-existing referential relationship on the multiple servers. In some embodiments, the one or more operation statements can comprise at least one of (1) a first operation statement with instructions to perform a first operation of creating a referential relationship between data on the first server and the second server, (2) a second operation statement with instructions to perform a second operation of updating the referential relationship between the data on the first server and the second server, or (3) a third operation statement with instructions to perform a third operation of deleting the referential relationship between the data on the first server and the second server.

In some embodiments, data of the referential relationship on multiple servers can include UPC or SKUs for a product. By way of a non-limiting example, an action command can comprise one or more operation statements with instructions to perform an operation of creating a referential relationship on the multiple servers when a supplier sends a new product with a UPC. In such an example, the data of referential relationship on the multiple servers can be the UPC associated with the new product from the supplier. In another non-limiting example, an action command can comprise one or more operation statements with instructions to perform an operation of creating a referential relationship on the multiple servers when a seller creates a product with a new SKU. In such an example, the data of the referential relationship on the multiple servers can be a SKU associated with the product created by the seller. In another non-limiting example, an action command can comprise one or more operation statements with instructions to perform an operation of updating a pre-existing referential relationship on the multiple servers when a seller attaches a UPC to a SKU already saved on the multiple servers. In such an example, the data of the pre-existing referential relationship can comprise the SKU of the product, and the data of the pre-existing referential relationship can be modified to include the UPC of the product, or vice versa.

In another non-limiting example, a single action command can comprise multiple operations similar to those described in the preceding paragraph. For example, an action command can create a referential relationship on the multiple servers and can comprise, for each server for the multiple servers, an operation statement with instructions to store a UPC received from a supplier for a new product, an operation statement with instructions to store or create a new SKU for the new product, and an operation statement with instructions to attach the UPC for the new product to the SKU for the new product. If part of a single action command, each of these operations must be completed on each server of the multiple servers. If any single operation of the three operations fails on any of the multiple servers, then all of the operations associated with this action command on all of the servers are undone using the undo operation statements, as described in greater detail below.

Method 400 can comprise an activity 410 of transmitting an undo operation statement to each of the first server and the second server with each of the one or more operation statements. In some embodiments, the undo operation statement can comprise at least one of (1) a first undo operation statement with instructions to undo the first operation, (2) a second operation statement with instructions to undo the second operation, or (3) a third undo operation statement with instructions to undo the third operation. The first server can perform an undo operation according to the undo operation statement responsive to receiving communication from the second server that at least one of the first operation, the second operation, or the third operation has failed on the second server.

In some embodiments, each operation statement is transmitted with a corresponding undo operation statement for that particular operation statement. For example, the one or more operation statements of the action command can comprise at least the first operation statement with the instructions to create the referential relationship between the data on first server 601 (FIG. 6) and second server 602 by adding the data to first server 601 and second server 602. If the one or more operation statements comprise the first operation statement with the instructions to create the referential relationship between the data on first server 601 and second server 602 by adding the data to first server 601 and second server 602, then the undo operation statement can comprise at least the first undo operation statement with the instructions to the undo the first operation and can be transmitted to first server 601 and second server 602 with the first operation statement. Responsive to receiving communication from second server 602 that the first operation associated with the first operation statement of adding the data to second server 602 has failed on second server 602, first server 601 can perform the first undo operation statement to undo creation of the referential relationship between the data on first server 601 and second server 602 by removing the data from first server 601.

As noted above, in some embodiments, the first operation statement can comprise instructions to perform a first operation of creating a referential relationship between the data on the first server and the data on the second server. Creating the referential relationship between the data on first server 601 and second server 602 also can comprise transmitting the data to first server 601 and second server 602. Data of the referential relationship can comprise UPCs, SKUs, and the like. For example, in some embodiments, the first operation statement can comprise instructions to perform the first operation of creating the referential relationship between at least one of (1) a UPC of a product of an ecommerce website added to both the first server and the second server, or (2) a SKU of the product of the ecommerce website added to both the first server and the second server.

By way of another example, the one or more operation statements of the action command can comprise at least the second operation statement with the instructions to update the referential relationship between the data on first server 601 and second server 602 by modifying the data on first server 601 and second server 602. If the one or more operation statements comprise the second operation statement with the instructions to update the referential relationship between the data on first server 601 and second server 602 by modifying the data on first server 601 and second server 602, then the undo operation statement can comprise at least the second undo operation statement with the instructions to the undo the second operation and can be transmitted to first server 601 and second server 602 with the second operation statement. Responsive to receiving the communication from second server 602 that the second operation associated with the second operation statement of modifying the data on second server 602 has failed on second server 602, first server 601 can perform the second undo operation statement to undo a modification of the referential relationship between the data on first server 601 and second server 602 by removing the modification of the data from first server 601.

As noted above, the second operation statement can comprise instructions to perform the second operation of updating the referential relationship between the data on the first server and the second server. In more particular embodiments, the second operation statement comprises instructions to perform the second operation of updating the referential relationship between at least one of: (1) the UPC of the product of the ecommerce website previously added to both the first server and the second server by including the SKU of the product of the ecommerce website with the UPC; (2) the SKU of the product of the ecommerce website previously added to both the first server and the second server by including the UPC of the product of the ecommerce website with the UPC; or (3) the UPC or the SKU of the product of the ecommerce website previously added to both the first server and the second server by modifying the UPC or the SKU of the product of the ecommerce website.

By way of another example, the one or more operation statements of the action command can comprise at least the third operation statement with the instructions to delete the referential relationship between the data on first server 601 and second server 601 by deleting the data from first server 601 and second server 602. If the one or more operation statements of the action command comprise at least the third operation statement with the instructions to delete the referential relationship between the data on first server 601 and second server 601 by deleting the data from first server 601 and second server 602, then the undo operation statement can comprise at least the third undo operation statement with the instructions to the undo the third operation and can be transmitted to first server 601 and second server 602 with the third operation statement. Responsive to receiving the communication from second server 602 that the third operation associated with the third operation statement of deleting the data from second server 602 has failed on second server 602, first server 601 performs the third undo operation statement to undo deletion of the referential relationship between the data on first server 601 and second server 602 by restoring the data deleted from first server 601.

As noted above, the third operation statement can comprise instructions to perform the third operation of deleting the referential relationship between the data on the first server and the second server. In more particular embodiments, the third operation statement comprises instructions to perform the third operation of deleting the referential relationship between at least one of: (1) the UPC of the product of the ecommerce website previously added to both the first server and the second server by deleting the UPC of the product of the ecommerce web site from both the first server and the second server; or (2) the SKU of the product of the ecommerce website previously added to both the first server and the second server by deleting the SKU of the product of the ecommerce website from both the first server and the second server.

In a more particular, non-limiting example, an operation statement can comprise instructions to create a new SKU for a UPC on first server 601 (FIG. 6) and second server 602. A corresponding undo operation statement transmitted with this operation statement can comprise instructions to delete the relationship created between the UPC and SKU. In another non-limiting example, an operation statement can comprise instruction to update and add a second UPC to an existing SKU on each of first server 601 and second server 602. A corresponding undo operation statement transmitted with this operation statement can comprise instruction to delete the relationship between the second UPC and the existing SKU.

While each of the above non-limiting examples reference only individual operation statements and undo statements, it is further contemplated that an action command can comprise a plurality of operation statements and a corresponding undo operation statement for each operation statement of the plurality of operation statements. Each operation statement of the plurality of operation statements can comprise any of the first operation statement, the second operation statement, or the third operation statement as described in greater detail above. More particularly, an action command can comprise a single first operation statement or a plurality of first operation statements, a single second operation statement or a plurality of second operation statements, a single third operation statement or a plurality of third operation statements, or any combination thereof. In these embodiments, each operation statement of the plurality of operation statements can be transmitted with a corresponding undo operation statement.

More particularly, in some embodiments, the one or more operation statements of the action command can comprise a plurality of operation statements. In these embodiments, the undo operation statement can comprise a plurality of undo operation statements. Each undo operation statement of the plurality of undo operation statements can be transmitted with a different one of the plurality of operation statements to first server 601 and second server 602. Each undo operation statement of the plurality of undo operation statements also can correspond to the different one of the plurality of operation statements with instructions to undo one of the first operation, the second operation, or the third operation associated with the different one of the plurality of operation statements if the one of the first operation, the second operation, or the third operation associated with the different one of the plurality of operation statements fails on either of first server 601 or second server 602.

In some embodiments, first server 601 can perform a plurality of undo operations according to the plurality of undo operation statements responsive to receiving communication from second server 602 that a specific operation associated with the plurality of operation statements of the action command has failed on second server 602. By way of a non-limiting example, assume that an action command comprises five operation statements and that first server 601 successfully completes all five operations associated with the five operation statements. Continuing with this non-limiting example, assume second server 602 fails to successfully complete an operation associated with the fourth operation of the five operation statements of the action command. Responsive to receiving communication from second server 602 that the fourth operation of the action command failed on the second server, first server 601 performs an undo operation for each of the five operation statements to completely undo all five operations associated with the action command.

It is further contemplated that sometimes an undo operation associated with an undo operation statement can fail. In some embodiments, first server 601 and/or second server 602 can record that the undo operation has failed and the failed undo operation can be corrected offline using a batch process. In some embodiments, operation statements of the action can command can comprise instructions to solve this problem that may arise. For example, in some embodiments, operation statements can include instructions to perform an operation within a predetermined time, perform an operation dependent upon another operation, and/or perform an operation only if the data does not already exist. When system 300 (FIG. 3) provides such qualifiers in the operation statements transmitted to first server 601 (FIG. 6) and second server 602, system 300 can verify that the preconditions exist and then operate accordingly.

Returning to FIG. 4, method 400 can comprise an activity 415 of receiving a fail notification from the second server indicating that an action associated with the action command has failed. More particularly, activity 415 can comprise receiving a fail notification from second server 602 (FIG. 6) indicating that an action associated with the action command has failed if the first operation, the second operation, or the third operation has failed on second server 602 (FIG. 6). In more particular embodiments comprising a plurality of operation statements, activity 415 can comprise receiving an undo notification from the first server and second server 602 (FIG. 6) that all operation statements of the plurality of operation statements of the action command have been undone on first server 601 and second server 602. In some embodiments, a method can comprise an activity of receiving a success notification from at least one of first server 601 or second server 602 indicating that the action command has succeeded.

FIG. 5 illustrates a block diagram of a portion of system 300 comprising communication system 310, web server 320, and display system 360, according to the embodiment shown in FIG. 3. Each of communication system 310, web server 320, and display system 360, is merely exemplary and not limited to the embodiments presented herein. Each of communication system 310, web server 320, and display system 360, can be employed in many different embodiments or examples not specifically depicted or described herein. In some embodiments, certain elements or modules of communication system 310, web server 320, and display system 360, can perform various procedures, processes, and/or acts. In other embodiments, the procedures, processes, and/or acts can be performed by other suitable elements or modules.

In many embodiments, communication system 310 can comprise non-transitory memory storage modules 512 and 514, and display system 360 can comprise a non-transitory memory storage module 562. Memory storage module 512 can be referred to as transmission module 512. In many embodiments, transmission module 512 can store computing instructions configured to run on one or more processing modules and perform one or more acts of method 400 (FIG. 4) (e.g., activity 405 of transmitting an undo operation statement to each of the first server and the second server with each of the one or more operation statements; and activity 410 of transmitting an undo operation statement to each of the first server and the second server with each of the one or more operation statements (FIG. 4)). Memory storage module 514 can be referred to as receiving module 514. In many embodiments, receiving module 514 can store computing instructions configured to run on one or more processing modules and perform one or more acts of method 400 (FIG. 4) (e.g. activity 415 of receiving a fail notification from the second server indicating than an action associated with the action command has failed (FIG. 4)). Memory storage module 562 can be referred to as display module 562. In some embodiments, display module 562 can store computing instructions configured to run on one or more processing modules and perform one or more acts (e.g., an activity of coordinating a display of the fail notification to the user).

Turning ahead in the drawings, FIG. 7 illustrates a flow chart for a method 700, according to an embodiment. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of method 700 can be performed in any suitable order. In still other embodiments, one or more of the activities of method 700 can be combined or skipped. In many embodiments, one of servers 601 or 602 (FIG. 6) can be suitable to perform method 700 and/or one or more of the activities of method 700. In these or other embodiments, one or more of the activities of method 700 can be implemented as one or more computer instructions configured to run at one or more processing modules and configured to be stored at one or more non-transitory memory storage modules 605, 610, and/or 615 (FIG. 6). Such non-transitory memory storage modules can be part of a computer system of servers 601 and/or 602 (FIG. 6). The processing module(s) can be similar or identical to the processing module(s) described above with respect to computer system 100 (FIG. 1).

Method 700 can comprise an activity 705 of receiving an action command, the action command comprising one or more operation statements. More particularly, receiving the action command can comprise receiving the action command on first server 601 (FIG. 6). The action command can be sent to one or more additional servers, such as but not limited to second server 602. The action command can be sent from a caller system, such as but not limited to system 300 (FIG. 3). The action command can comprise one or more operation statements with instructions to perform one or more operations, as described above.

Returning to FIG. 7, method 700 can comprise an activity 710 of receiving an undo operation statement with each of the one or more operation statements. More particularly, receiving the undo operation can comprise receiving the undo operation on first server 601 (FIG. 6), the undo operation being sent with the one or more operation statements. The undo operation can be sent to one or more additional servers, such as but not limited to second server 602 (FIG. 6). The undo operation can be sent with the one or more operation statements and can be sent from a caller system, such as but not limited to system 300 (FIG. 3). The undo operation can comprise any of the undo operations described above, with instructions to undo particular operations as described above.

Returning to FIG. 7, method 700 can comprise an activity 715 of performing one or more operations associated with the one or more operation statements of the action command. More particularly, performing the one or more operations can comprise performing the one or more operation on first server 601 (FIG. 6). The one or more operations associated with the one or more operation statements of the action command can comprise any of the operations described above.

Returning to FIG. 7, method 700 can comprise an activity 720 of receiving notification from a remote server that at least one of the one or more operation statements of the action command has failed on the remote server. More particularly, receiving notification from the remote server can comprise receiving, by first server 601 (FIG. 6), notification from second server 602 (FIG. 6). Alternatively, the remote server can comprise any additional server in a cloud system of servers with first server 601 (FIG. 6). The notification can be received from the remote server through Internet 330 (FIG. 3).

Returning to FIG. 7, method 700 can comprise an activity 725 of performing or otherwise executing an undo operation associated with the undo operation statement to undo the one or more operations associated with the one or more operation statements of the action command. More particularly, performing the undo operation associated with the undo operation statement can comprise performing, on first server 601 (FIG. 6), the undo operation associated with the undo operation statement. The undo operation can comprise any of the undo operations described above. If an action command comprises a plurality of operation statements and if a server receives notification that an operation has failed on a server of the cloud-based server system, then all the undo operation statements for all the previously successful operation statements are executed, and the entire action is marked as failed. As execution of the undo statement operation also can fail, in some embodiments a failed undo operation is also recorded by the server for later correction offline using a batch process.

Returning to FIG. 7, method 700 can comprise an activity 730 of transmitting a fail notification indicating that an action associated with the action command has failed an all operations have been undone. More particularly, transmitting a fail notification as described can comprise transmitting, from first server 601 (FIG. 6), the fail notification to a caller system, such as but not limited to system 300 (FIG. 3). The fail notification can comprise details of which particular operation statement failed, why the particular operation statement failed, and/or upon which server the particular operation statement first failed. Alternatively, if all operations succeed, a method can comprise an activity of transmitting a success notification indicating that the action has succeeded.

Turning to the previous drawing, FIG. 6 illustrates a block diagram of a portion of system 300 and servers 601 and 602. Each of servers 601 and 602 is exemplary and not limited to the embodiments presented herein. Each of servers 601 and 602, can be employed in many different embodiments or examples not specifically depicted or described herein. In some embodiments, certain elements or modules of communication servers 601 and 602, can perform various procedures, processes, and/or acts. In other embodiments, the procedures, processes, and/or acts can be performed by other suitable elements or modules.

In many embodiments, each server 601 and 602 can comprise non-transitory memory storage modules 605, 610, and 615. Memory storage module 605 can be referred to as operation module 605. In many embodiments, operation module 605 can store computing instructions configured to run on one or more processing modules and perform one or more acts of method 700 (FIG. 7) (e.g., activity 715 of performing one or more operations associated with the one or more operation statements (FIG. 7)). Memory storage module 610 can be referred to as undo module 610. In many embodiments, undo module 610 can store computing instructions configured to run on one or more processing modules and perform one or more acts of method 700 (FIG. 7) (e.g. activity 725 of performing an undo operation associated with the undo operation statement to undo the one or more operations associated with the one or more operation statements (FIG. 7)). Memory storage module 615 can be referred to as communications module 615. In some embodiments, communications module 615 can store computing instructions configured to run on one or more processing modules and perform one or more acts of method 700 (FIG. 7) (e.g. activity 705 of receiving an action command, the action command comprising one or more operation statements; activity 710 of receiving an undo operation statement with each of the one or more operation statement; activity 720 of receiving notification from a remote server that at least one of the one or more operations associated with the one or more operation statements of the action command has failed on a remote server; and activity 730 of transmitting a fail notification indicating that an action associated with the action command has failed an all operations have been undone (FIG. 7)).

Although systems and methods for creating and maintaining referential integrity of data across multiple server systems have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 4 and 7 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory storage devices storing computing instructions configured to run on the one or more processors and perform:
   transmitting an action command to each of a first server and a second server, wherein:
   the action command comprises one or more operation statements;
   the one or more operation statements comprise at least one of:
   (1) a first operation statement with instructions to perform a first operation of creating a referential relationship between data stored in a first database on the first server and data stored in a second database on the second server;
   (2) a second operation statement with instructions to perform a second operation of updating the referential relationship between the data stored in the first database on the first server and the data stored in the second database on the second server; or
   (3) a third operation statement with instructions to perform a third operation of deleting the referential relationship between the data stored in the first database on the first server and the data stored in the second database on the second server; and
   the first database on the first server and the second database on the second server comprise copies of a same database;
   receiving a commit notification from the first server indicating that an operation statement of the one or more operation statements has succeeded when the first operation statement, the second operation statement, or the third operation statement has succeeded on the first server;
   receiving a first fail notification from the second server indicating that the operation statement of the one or more operation statements has failed when the first operation statement, the second operation statement, or the third operation statement has failed on the second server;
   in response to receiving the first fail notification, transmitting the first fail notification to the first server;
   after transmitting the first fail notification to the first server, transmitting an undo command to each of the first server and the second server, wherein:
   the undo command comprises one or more undo operation statements;
   the one or more undo operation statements comprise at least one of:
   (1) a first undo operation statement with instructions to undo the first operation;
   (2) a second undo operation statement with instructions to undo the second operation; or
   (3) a third undo operation statement with instructions to undo the third operation; and the first server performs an undo operation according to the undo command upon receiving:
the first fail notification that the operation statement has failed on the second server; and
the undo command;
after transmitting the undo command, receiving a second fail notification from the second server indicating that an undo operation statement of the undo command has failed on the second server; and
after receiving the second fail notification, initiating a correction of the data stored in the first database on the first server and the data stored in the second database on the second server, the correction comprising performing, at a later time in an offline batch process, the action command on the data stored in the first database on the first server and the data stored in the second database on the second server.

2. The system of claim 1, wherein:
the one or more operation statements of the action command comprise at least the first operation statement with the instructions to create the referential relationship between the data stored in the first database on the first server and the data stored in the second database on the second server by adding data of the referential relationship to the first server and the second server; and
the first server performs the first undo operation statement for the undo operation to undo creation of the referential relationship between the data stored in the first database on the first server and the data stored in the second database on the second server by removing at least a portion of the data stored in the first database from the first server responsive to receiving the first fail notification from the second server that the first operation associated with the first operation statement of adding the data of the referential relationship to the second server has failed on the second server.

3. The system of claim 1, wherein:
the one or more operation statements of the action command comprise at least the second operation statement with the instructions to update the referential relationship between the data stored in the first database on the first server and the data stored in the second database on the second server by modifying the data stored in the first database on the first server and the data stored in the second database on the second server; and
the first server performs the second undo operation statement for the undo operation to undo a modification of the referential relationship between the data stored in the first database on the first server and the data stored in the second database on the second server by removing the modification of the data stored in the first database from the first server responsive to receiving the first fail notification from the second server that the second operation associated with the second operation statement of modifying the data stored in the second database on the second server has failed on the second server.

4. The system of claim 1, wherein:
the one or more operation statements of the action command comprise at least the third operation statement with the instructions to delete the referential relationship between the data stored in the first database on the first server and the data stored in the second database on the second server by:
deleting at least a portion of the data stored in the first database from the first server; and
deleting at least a portion of the data stored in the second database from the second server; and
the first server performs the third undo operation statement for the undo operation to undo deletion of the referential relationship between the data stored in the first database on the first server and the data stored in the second database on the second server by restoring at least the portion of the data stored in the first database deleted from the first server responsive to receiving the first fail notification from the second server that the third operation associated with the third operation statement of deleting the at least the portion of the data stored in the second database from the second server has failed on the second server.

5. The system of claim 1, wherein:
the first operation statement with the instructions to perform the first operation of creating the referential relationship between the data stored in the first database on the first server and the data stored in the second database on the second server comprises instructions to perform the first operation of creating the referential relationship between at least one of:
(1) a universal product code (UPC) of a product of an ecommerce website added to both the first database on the first server and the second database on the second server; or
(2) a stock keeping unit (SKU) of the product of the ecommerce website added to both the first database on the first server and the second database on the second server;
the second operation statement with the instructions to perform the second operation of updating the referential relationship between the data stored in the first database on the first server and the data stored in the second database on the second server comprises instructions to perform the second operation of updating the referential relationship between at least one of:
(1) the UPC of the product of the ecommerce website previously added to both the first database on the first server and the second database on the second server by including the SKU of the product of the ecommerce website with the UPC of the product of the ecommerce website;
(2) the SKU of the product of the ecommerce website previously added to both the first database on the first server and the second database on the second server by including the UPC of the product of the ecommerce website with the UPC of the product of the ecommerce website; or
(3) the UPC or the SKU of the product of the ecommerce website previously added to both the first database on the first server and the second database on the second server by modifying the UPC or the SKU of the product of the ecommerce web site; and
the third operation statement with the instructions to perform the third operation of deleting the referential relationship between the data stored in the first database on the first server and the data stored in the second database on the second server comprises instructions to perform the third operation of deleting the referential relationship between at least one of:
(1) the UPC of the product of the ecommerce website previously added to both the first database on the first server and the second database on the second server by deleting the UPC of the product of the ecommerce website from both the first database on the first server and the second database on the second server; or (2) the SKU of the product of the ecommerce website previously added to both the first database on the first server and the second database on the second server by deleting the SKU of the product of the ecommerce website from both the first database on the first server and the second database on the second server.

6. The system of claim 1, wherein:
the one or more operation statements of the action command comprise a plurality of operation statements of the action command;
each undo operation statement of the one or more undo operation statements:
  (1) is transmitted with a different one of the plurality of operation statements to the first server and the second server; and
  (2) corresponds to the different one of the plurality of operation statements with instructions to undo one of the first operation, the second operation, or the third operation associated with the different one of the plurality of operation statements when the one of the first operation, the second operation, or the third operation associated with the different one of the plurality of operation statements fails on either of the first server or the second server;
the first server performs a plurality of undo operations according to the one or more undo operation statements responsive to receiving the first fail notification from the second server that a specific operation associated with the plurality of operation statements of the action command has failed on the second server; and
the one or more non-transitory storage devices storing the computing instructions are further configured to run on the one or more processors and perform:
  receiving one or more undo notifications from the first server and the second server that all operation statements of the plurality of operation statements of the action command have been undone on the first server and the second server.

7. The system of claim 1, wherein the first server and the second server are located remotely from one another and operate as a cloud system of servers.

8. The system of claim 1, wherein the first fail notification is received from the second server when the action command takes longer than a predetermined time to execute on the second server.

9. A method comprising:
transmitting an action command to each of a first server and a second server, wherein:
  the action command comprises one or more operation statements;
  the one or more operation statements comprise at least one of:
    (1) a first operation statement with instructions to perform a first operation of creating a referential relationship between data stored in a first database on the first server and data stored in a second database on the second server;
    (2) a second operation statement with instructions to perform a second operation of updating the referential relationship between the data stored in the first database on the first server and the data stored in the second database on the second server; or
    (3) a third operation statement with instructions to perform a third operation of deleting the referential relationship between the data stored in the first database on the first server and the data stored in the second database on the second server; and
  the first database on the first server and the second database on the second server comprise copies of a same database;
receiving a commit notification from the first server indicating that an operation statement of the one or more operation statements has succeeded when the first operation statement, the second operation statement, or the third operation statement has succeeded on the first server;
receiving a first fail notification from the second server indicating that the operation statement of the one or more operation statements has failed when the first operation statement, the second operation statement, or the third operation statement has failed on the second server;
in response to receiving the first fail notification, transmitting the first fail notification to the first server;
after transmitting the first fail notification to the first server, transmitting an undo command to each of the first server and the second server, wherein:
  the undo command comprises one or more undo operation statements;
  the one or more undo operation statements comprise at least one of:
    (1) a first undo operation statement with instructions to undo the first operation;
    (2) a second undo operation statement with instructions to undo the second operation; or
    (3) a third undo operation statement with instructions to undo the third operation; and
  the first server performs an undo operation according to the undo command upon receiving:
    the first fail notification that the operation statement has failed on the second server; and
    the undo command;
after transmitting the undo command, receiving a second fail notification from the second server indicating that an undo operation statement of the undo command has failed on the second server; and
after receiving the second fail notification, initiating a correction of the data stored in the first database on the first server and the data stored in the second database on the second server, the correction comprising performing, at a later time in an offline batch process, the action command on the data stored in the first database on the first server and the data stored in the second database on the second server.

10. The method of claim 9, wherein:
the one or more operation statements of the action command comprise at least the first operation statement with the instructions to create the referential relationship between the data stored in the first database on the first server and the data stored in the second database on the second server by adding data of the referential relationship to the first server and the second server; and
the first server performs the first undo operation statement for the undo operation to undo creation of the referential relationship between the data stored in the first database on the first server and the data stored in the second database on the second server by removing at least a portion of the data stored in the first database from the first server responsive to receiving the first fail notification from the second server that the first operation associated with the first operation statement of adding the data of the referential relationship to the second server has failed on the second server.

11. The method of claim 9, wherein:
the one or more operation statements of the action command comprise at least the second operation statement with the instructions to update the referential relationship between the data stored in the first database on the first server and the data stored in the second database on the second server by modifying the data stored in the first database on the first server and the data stored in the second database on the second server; and
the first server performs the second undo operation statement for the undo operation to undo a modification of the referential relationship between the data stored in the first database on the first server and the data stored in the second database on the second server by removing the modification of the data stored in the first database from the first server responsive to receiving the first fail notification from the second server that the second operation associated with the second operation statement of modifying the data stored in the second database on the second server has failed on the second server.

12. The method of claim 9, wherein:
the one or more operation statements of the action command comprise at least the third operation statement with the instructions to delete the referential relationship between the data stored in the first database on the first server and the data stored in the second database on the second server by:
  deleting at least a portion of the data stored in the first database from the first server; and
  deleting at least a portion of the data stored in the second database from the second server; and
the first server performs the third undo operation statement for the undo operation to undo deletion of the referential relationship between the data stored in the first database on the first server and the data stored in the second database on the second server by restoring at least the portion of the data stored in the first database deleted from the first server responsive to receiving the first fail notification from the second server that the third operation associated with the third operation statement of deleting the at least the portion of the data stored in the second database from the second server has failed on the second server.

13. The method of claim 9, wherein:
the first operation statement with the instructions to perform the first operation of creating the referential relationship between the data stored in the first database on the first server and the data stored in the second database on the second server comprises instructions to perform the first operation of creating the referential relationship between at least one of:
  (1) a universal product code (UPC) of a product of an ecommerce website added to both the first database on the first server and the second database on the second server; or
  (2) a stock keeping unit (SKU) of the product of the ecommerce website added to both the first database on the first server and the second database on the second server;
the second operation statement with the instructions to perform the second operation of updating the referential relationship between the data stored in the first database on the first server and the data stored in the second database on the second server comprises instructions to perform the second operation of updating the referential relationship between at least one of:
  (1) the UPC of the product of the ecommerce website previously added to both the first database on the first server and the second database on the second server by including the SKU of the product of the ecommerce website with the UPC of the product of the ecommerce website;
  (2) the SKU of the product of the ecommerce website previously added to both the first database on the first server and the second database on the second server by including the UPC of the product of the ecommerce website with the UPC of the product of the ecommerce website; or
  (3) the UPC or the SKU of the product of the ecommerce website previously added to both the first database on the first server and the second database on the second server by modifying the UPC or the SKU of the product of the ecommerce web site; and
the third operation statement with the instructions to perform the third operation of deleting the referential relationship between the data stored in the first database on the first server and the data stored in the second database on the second server comprises instructions to perform the third operation of deleting the referential relationship between at least one of:
  (1) the UPC of the product of the ecommerce website previously added to both the first database on the first server and the second database on the second server by deleting the UPC of the product of the ecommerce website from both the first database on the first server and the second database on the second server; or
  (2) the SKU of the product of the ecommerce website previously added to both the first database on the first server and the second database on the second server by deleting the SKU of the product of the ecommerce website from both the first database on the first server and the second database on the second server.

14. The method of claim 9, wherein:
the one or more operation statements of the action command comprise a plurality of operation statements of the action command;
each undo operation statement of the one or more undo operation statements:
  (1) is transmitted with a different one of the plurality of operation statements to the first server and the second server; and
  (2) corresponds to the different one of the plurality of operation statements with instructions to undo one of the first operation, the second operation, or the third operation associated with the different one of the plurality of operation statements when the one of the first operation, the second operation, or the third operation associated with the different one of the plurality of operation statements fails on either of the first server or the second server;
the first server performs a plurality of undo operations according to the one or more undo operation statements responsive to receiving the first fail notification from the second server that a specific operation associated with the plurality of operation statements of the action command has failed on the second server; and the method further comprises:
receiving one or more undo notifications from the first server and the second server that all operation statements of the plurality of operation statements of the action command have been undone on the first server and the second server.

15. The method of claim 9, wherein the first server and the second server are located remotely from one another and operate as a cloud system of servers.

16. A system comprising:
one or more processors; and
one or more non-transitory storage devices storing computing instructions configured to run on the one or more processors and perform:
transmitting an action command to each of a first server and a second server, wherein:
the first server and the second server are located remotely from one another and operate as at least a portion of a cloud system of servers;
the action command comprises one or more operation statements;
the one or more operation statements comprise at least one of:
a first operation statement with instructions to perform a first operation of creating a referential relationship between at least one of:
(1) a universal product code (UPC) of a product of an ecommerce website added to both a first database on the first server and a second database on the second server; or
(2) a stock keeping unit (SKU) of the product of the ecommerce website added to both the first database on the first server and the second database on the second server;
a second operation statement with instructions to perform a second operation of updating the referential relationship between at least one of:
(1) the UPC of the product of the ecommerce website previously added to both the first database on the first server and the second database on the second server by including the SKU of the product of the ecommerce website with the UPC of the product of the ecommerce website;
(2) the SKU of the product of the ecommerce web site previously added to both the first database on the first server and the second database on the second server by including the UPC of the product of the ecommerce website with the UPC of the product of the ecommerce website; or
(3) the UPC or the SKU of the product of the ecommerce website previously added to both the first database on the first server and the second database on the second server by modifying the UPC or the SKU of the product of the ecommerce website; or
a third operation statement with instructions to perform a third operation of deleting the referential relationship between at least one of:
(1) the UPC of the product of the ecommerce website previously added to both the first database on the first server and the second database on the second server by deleting the UPC of the product of the ecommerce website from both the first database on the first server and the second database on the second server; or
(2) the SKU of the product of the ecommerce web site previously added to both the first database on the first server and the second database on the second server by deleting the SKU of the product of the ecommerce website from both the first database on the first server and the second database on the second server; and
the first database on the first server and the second database on the second server comprise copies of a same database;
receiving a commit notification from the first server indicating that an operation statement of the one or more operation statements has succeeded when the first operation statement, the second operation statement, or the third operation statement has succeeded on the first server;
receiving a first fail notification from the second server indicating that the operation statement of the one or more operation statements has failed when the first operation statement, the second operation statement, or the third operation statement has failed on the second server;
in response to receiving the first fail notification, transmitting the first fail notification to the first server;
after transmitting the first fail notification to the first server, transmitting an undo command to each of the first server and the second server, wherein:
the undo command comprises one or more undo operation statements;
the one or more undo operation statements comprise at least one of:
(1) a first undo operation statement with instructions to undo the first operation;
(2) a second undo operation statement with instructions to undo the second operation; or
(3) a third undo operation statement with instructions to undo the third operation; and
the first server performs an undo operation according to the undo command upon receiving:
the first fail notification from the second server that the operation statement has failed on the second server; and
the undo command;
after transmitting the undo command, receiving a second fail notification from the second server indicating that an undo operation statement of the undo command has failed on the second server; and
after receiving the second fail notification, initiating a correction of data stored in the first database on the first server and data stored in the second database on the second server, the correction comprising performing, at a later time in an offline batch process, the action command on the data stored in the first database on the first server and the data stored in the second database on the second server.

17. The system of claim 16, wherein:
the one or more operation statements of the action command comprise at least the first operation statement with the instructions to perform the first operation statement of creating the referential relationship on the first database on the first server and the second database on the second server by adding, to both the first database on the first server and the second database on the second server, the at least one of (1) the UPC of the product of the ecommerce website or (2) the SKU of the product of the ecommerce website; and the first server performs the first undo operation statement for the undo operation to undo the first operation of creating the referential relationship between the data on the first database on the first server and the second database on the second server by removing the UPC or the SKU from the first database on the first server responsive to receiving the first fail notification from the second server that the first operation associated with the first operation statement of adding the at least one of the UPC or the SKU to the second database on the second server has failed on the second server.

18. The system of claim 16, wherein:

the one or more operation statements of the action command comprise at least the second operation statement with the instructions to perform the second operation of updating the referential relationship between at least one of:
  (1) the UPC of the product of the ecommerce website previously added to the first database on the first server and the second database on the second server by including the SKU of the product of the ecommerce website with the UPC of the product of the ecommerce website;
  (2) the SKU of the product of the ecommerce website previously added to both the first database on the first server and the second database on the second server by including the UPC of the product of the ecommerce website with the UPC of the product of the ecommerce website; or
  (3) the UPC or the SKU of the product of the ecommerce website previously added to both the first database on the first server and the second database on the second server by modifying the UPC or the SKU of the product of the ecommerce web site; and the first server performs the second undo operation statement for the undo operation to undo the second operation of updating the referential relationship on the first database on the first server and the second database on the second server by removing, from the first database on the first server and the second database on the second server responsive to receiving the first fail notification from the second server that the second operation associated with the second operation statement of modifying the data on the second server has failed on the second server, a modification of the at least one of:
  (1) the UPC of the product of the ecommerce website previously added to both the first database on the first server and the second database on the second server;
  (2) the SKU of the product of the ecommerce website previously added to both the first database on the first server and the second database on the second server; or
  (3) the UPC or the SKU of the product of the ecommerce website previously added to both the first database on the first server and the second database on the second server.

19. The system of claim 16, wherein:

the action command comprises at least the third operation statement with the instructions to perform the third operation of deleting the referential relationship between the at least one of:
  (1) the UPC of the product of the ecommerce website previously added to both the first database on the first server and the second database on the second server by deleting the UPC of the product of the ecommerce website from both the first database on the first server and the second database on the second server; or
  (2) the SKU of the product of the ecommerce website previously added to both the first database on the first server and the second database on the second server by deleting the SKU of the product of the ecommerce website from both the first database on the first server and the second database on the second server; and the first server performs the third undo operation statement for the undo operation to undo the third operation of deleting of the referential relationship between the UPC or the SKU of the product of the ecommerce website on the first database on the first server and the second database on the second server by restoring the UPC or the SKU of the product of the ecommerce website deleted from the first database on the first server responsive to receiving the first fail notification from the second server that the third operation of deleting at least one of the UPC or the SKU of the product of the ecommerce website from the second database on the second server has failed on the second server.

20. The system of claim 16, wherein:

the one or more operation statements of the action command comprise a plurality of operation statements of the action command;

each undo operation statement of the plurality of one or more undo operation statements:
  (1) is transmitted with a different one of the plurality of operation statements to the first server and the second server; and
  (2) corresponds to the different one of the plurality of operation statements with instructions to undo one of the first operation, the second operation, or the third operation associated with the different one of the plurality of operation statements when the one of the first operation, the second operation, or the third operation associated with the different one of the plurality of operation statements fails on either of the first server or the second server;

the first server performs a plurality of undo operations according to the one or more undo operation statements responsive to receiving the first fail notification from the second server that a specific operation associated with the plurality of operation statements of the action command has failed on the second server; and the one or more non-transitory storage devices storing the computing instructions are further configured to run on the one or more processors and perform:
  receiving one or more undo notifications from the first server and the second server that all operation statements of the plurality of operation statements of the action command have been undone on the first server and the second server.

* * * * *